United States Patent
Propheter-Hinckley et al.

(10) Patent No.: US 10,808,554 B2
(45) Date of Patent: Oct. 20, 2020

(54) METHOD FOR MAKING CERAMIC TURBINE ENGINE ARTICLE

(71) Applicant: UNITED TECHNOLOGIES CORPORATION, Farmington, CT (US)

(72) Inventors: Tracy A. Propheter-Hinckley, Manchester, CT (US); Michael G. McCaffrey, Windsor, CT (US); Raymond Surace, Newington, CT (US); Matthew A. Devore, Rocky Hill, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 619 days.

(21) Appl. No.: 15/354,055

(22) Filed: Nov. 17, 2016

(65) Prior Publication Data

US 2018/0135437 A1   May 17, 2018

(51) Int. Cl.
*F01D 5/28* (2006.01)
*F01D 9/06* (2006.01)
(Continued)

(52) U.S. Cl.
CPC .............. *F01D 5/284* (2013.01); *B23P 15/04* (2013.01); *B32B 18/00* (2013.01); *F01D 5/187* (2013.01);
(Continued)

(58) Field of Classification Search
CPC ....... F05D 2300/6033; F05D 2240/121; F05D 2240/303; F05D 2260/201; F05D 2260/204; F05D 2220/32; F05D 2230/60; F05D 2260/202; Y02T 50/676; Y02T 50/673; Y02T 50/672; F04D 29/542; F04D 29/388; F01D 5/284; F01D 9/042; F01D 5/282; F01D 25/12; F01D 9/041; F01D 5/187;
(Continued)

(56) References Cited

U.S. PATENT DOCUMENTS 3,215,511 A  11/1965  Chisholm
4,137,008 A   1/1979  Grant et al.
(Continued)

FOREIGN PATENT DOCUMENTS

EP  0764764  3/1997
EP  1764481  3/2007
(Continued)

OTHER PUBLICATIONS

U.S. Appl. No. 13/429,474, filed Mar. 26, 2012.
(Continued)

*Primary Examiner* — David P Bryant
*Assistant Examiner* — Christine Bersabal
(74) *Attorney, Agent, or Firm* — Carlson, Gaskey & Olds, P.C.

(57) ABSTRACT

A method of fabricating a ceramic turbine engine article includes building a wall of the article from preceramic layers, wherein the building includes arranging the preceramic layers around one or more sacrificial core elements, converting the preceramic layers to ceramic, and removing the one or more sacrificial core elements to leave one or more cavities in the wall.

13 Claims, 7 Drawing Sheets

(51) Int. Cl.

| | | |
|---|---|---|
| *B32B 18/00* | (2006.01) | |
| *F01D 9/04* | (2006.01) | |
| *B23P 15/04* | (2006.01) | |
| *F01D 5/18* | (2006.01) | |
| *F01D 25/12* | (2006.01) | |
| *F04D 29/38* | (2006.01) | |
| *F04D 29/54* | (2006.01) | |
| *F01D 5/14* | (2006.01) | |

(52) U.S. Cl.
CPC ............ *F01D 5/282* (2013.01); *F01D 9/041* (2013.01); *F01D 9/042* (2013.01); *F01D 9/065* (2013.01); *F01D 25/12* (2013.01); *F04D 29/388* (2013.01); *F04D 29/542* (2013.01); *C04B 2235/6028* (2013.01); *C04B 2237/38* (2013.01); *C04B 2237/62* (2013.01); *C04B 2237/84* (2013.01); *F01D 5/147* (2013.01); *F05D 2220/32* (2013.01); *F05D 2230/60* (2013.01); *F05D 2240/121* (2013.01); *F05D 2240/303* (2013.01); *F05D 2260/201* (2013.01); *F05D 2260/202* (2013.01); *F05D 2260/204* (2013.01); *F05D 2300/6033* (2013.01); *Y02T 50/672* (2013.01); *Y02T 50/673* (2013.01); *Y02T 50/676* (2013.01)

(58) Field of Classification Search
CPC ..... F01D 9/065; F01D 5/147; C04B 2237/38; C04B 2235/6028; C04B 2237/62; C04B 2237/84; B32B 18/00; B23P 15/04
See application file for complete search history.

(56) References Cited

U.S. PATENT DOCUMENTS

| | | | |
|---|---|---|---|
| 4,247,259 | A | 1/1981 | Saboe et al. |
| 4,396,349 | A | 8/1983 | Hueber |
| 4,914,794 | A | 4/1990 | Strangman |
| 5,358,379 | A | 10/1994 | Pepperman et al. |
| 5,538,380 | A | 7/1996 | Norton et al. |
| 5,681,616 | A | 10/1997 | Gupta et al. |
| 5,705,231 | A | 1/1998 | Nissley et al. |
| 5,951,892 | A | 9/1999 | Wolfla et al. |
| 6,000,906 | A | 12/1999 | Draskovich |
| 6,102,656 | A | 8/2000 | Nissley et al. |
| 6,224,963 | B1 | 5/2001 | Strangman |
| 6,316,078 | B1 | 11/2001 | Smialek |
| 6,503,574 | B1 | 1/2003 | Skelly et al. |
| 6,514,046 | B1 | 2/2003 | Morrison et al. |
| 6,543,996 | B2 | 4/2003 | Koschier |
| 6,703,137 | B2 | 3/2004 | Subramanian |
| 6,709,230 | B2 | 3/2004 | Morrison et al. |
| 6,846,574 | B2 | 1/2005 | Subramanian |
| 7,104,756 | B2 | 9/2006 | Harding et al. |
| 7,316,539 | B2 | 1/2008 | Campbell |
| 7,326,030 | B2 | 2/2008 | Albrecht et al. |
| 7,435,058 | B2 | 10/2008 | Campbell et al. |
| 7,452,182 | B2 | 11/2008 | Vance et al. |
| 7,494,557 | B1 * | 2/2009 | Peterson ................. B32B 18/00 156/89.11 |
| 7,520,725 | B1 | 4/2009 | Liang |
| 7,670,116 | B1 | 3/2010 | Wilson, Jr. et al. |
| 7,963,745 | B1 | 6/2011 | Liang |
| 8,079,806 | B2 | 12/2011 | Tholen et al. |
| 8,182,208 | B2 | 5/2012 | Bridges, Jr. et al. |
| 8,197,211 | B1 | 6/2012 | Liang |
| 8,202,043 | B2 | 6/2012 | McCaffrey |
| 8,251,651 | B2 | 8/2012 | Propheter-Hinckley et al. |
| 8,366,392 | B1 | 2/2013 | Laing |
| 8,480,366 | B2 | 7/2013 | Malecki et al. |
| 8,506,243 | B2 | 8/2013 | Strock et al. |
| 8,821,124 | B2 | 9/2014 | Viens et al. |
| 2002/0076541 | A1 * | 6/2002 | Jarmon ................. C04B 35/806 428/312.6 |
| 2003/0031555 | A1 * | 2/2003 | Noe ........................ F01D 5/189 415/115 |
| 2003/0059577 | A1 | 3/2003 | Morrison et al. |
| 2008/0159850 | A1 | 7/2008 | Tholen et al. |
| 2010/0136258 | A1 | 6/2010 | Strock et al. |
| 2014/0072736 | A1 | 3/2014 | Gray |
| 2014/0161626 | A1 | 6/2014 | Podgorski et al. |
| 2014/0193256 | A1 * | 7/2014 | Matsuda ............... F03D 1/0675 416/3 |
| 2016/0090851 | A1 | 3/2016 | Carr et al. |

FOREIGN PATENT DOCUMENTS

| | | |
|---|---|---|
| EP | 2105579 | 9/2009 |
| EP | 2853688 | 4/2015 |
| GB | 2272453 | 5/1994 |
| JP | 61066802 | 4/1986 |
| JP | 05321602 | 12/1993 |

OTHER PUBLICATIONS

U.S. Appl. No. 14/659,718, filed Mar. 17, 2015.
U.S. Appl. No. 14/812,668, filed Jul. 29, 2015.
European Search Report for European Patent Application No. 17202342.6 completed Mar. 9, 2018.

* cited by examiner

METHOD FOR MAKING CERAMIC TURBINE ENGINE ARTICLE

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device, such as an epicyclical gear assembly, may be utilized to drive the fan section such that the fan section may rotate at a speed different than the turbine section. In such engine architectures, a shaft driven by one of the turbine sections provides an input to the epicyclical gear assembly that drives the fan section at a reduced speed.

SUMMARY

A method of fabricating a ceramic turbine engine article according to an example of the present disclosure includes building a wall of the article from preceramic layers by arranging the preceramic layers around one or more sacrificial core elements, converting the preceramic layers to ceramic, and removing the one or more sacrificial core elements to leave one or more cavities in the wall.

In a further embodiment of any of the foregoing embodiments, the article is an airfoil piece that defines a portion of an airfoil profile.

In a further embodiment of any of the foregoing embodiments, the article is an airfoil piece that defines a leading end of an airfoil profile.

In a further embodiment of any of the foregoing embodiments, at least one of the cavities is an internal cooling circuit in the wall.

In a further embodiment of any of the foregoing embodiments, the internal cooling circuit includes a circuitous passage within the wall.

In a further embodiment of any of the foregoing embodiments, another of the cavities is a core cavity in the airfoil piece, and the core cavity is isolated from the internal cooling circuit.

In a further embodiment of any of the foregoing embodiments, one of the circuitous passage includes a passage loop.

In a further embodiment of any of the foregoing embodiments, the sacrificial core elements are carbon elements, and the removal of the one or more sacrificial core elements includes thermally removing the carbon elements.

In a further embodiment of any of the foregoing embodiments, the preceramic layers are fiber layers impregnated with preceramic polymer.

In a further embodiment of any of the foregoing embodiments, the preceramic layers are arranged to encompass at least one of the sacrificial core elements.

In a further embodiment of any of the foregoing embodiments, the wall includes a first internal rib and a second internal rib. The first internal rib includes an impingement orifice that opens toward the second internal rib.

In a further embodiment of any of the foregoing embodiments, the wall includes inner and outer wall portions that define a passage there between. One of the inner or outer wall portions includes a plurality of flow guides that project into the passage toward the other of the inner or outer wall portions.

In a further embodiment of any of the foregoing embodiments, the wall includes inner and outer wall portions that define a passage there between. One of the inner or outer wall portions includes a plurality of flow dimples that border the passage.

A method of fabricating a ceramic airfoil piece that defines a portion of an airfoil profile according to an example of the present disclosure includes building an exterior wall of the ceramic airfoil piece from preceramic layers by arranging the preceramic layers around one or more sacrificial core elements, converting the preceramic layers to ceramic, and removing the sacrificial core elements to leave an internal cooling circuit in the external wall of the ceramic airfoil piece.

In a further embodiment of any of the foregoing embodiments, the one or more sacrificial core elements are carbon elements, and the removal of the one or more sacrificial core elements includes thermally removing the carbon elements.

In a further embodiment of any of the foregoing embodiments, the preceramic layers are fiber layers impregnated with preceramic polymer.

In a further embodiment of any of the foregoing embodiments, the internal cooling circuit includes a circuitous passage within the exterior wall.

In a further embodiment of any of the foregoing embodiments, the ceramic airfoil piece defines a leading end of the airfoil profile.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 5A illustrates a sectioned view of another example ceramic airfoil piece.

DETAILED DESCRIPTION

Figure 1:
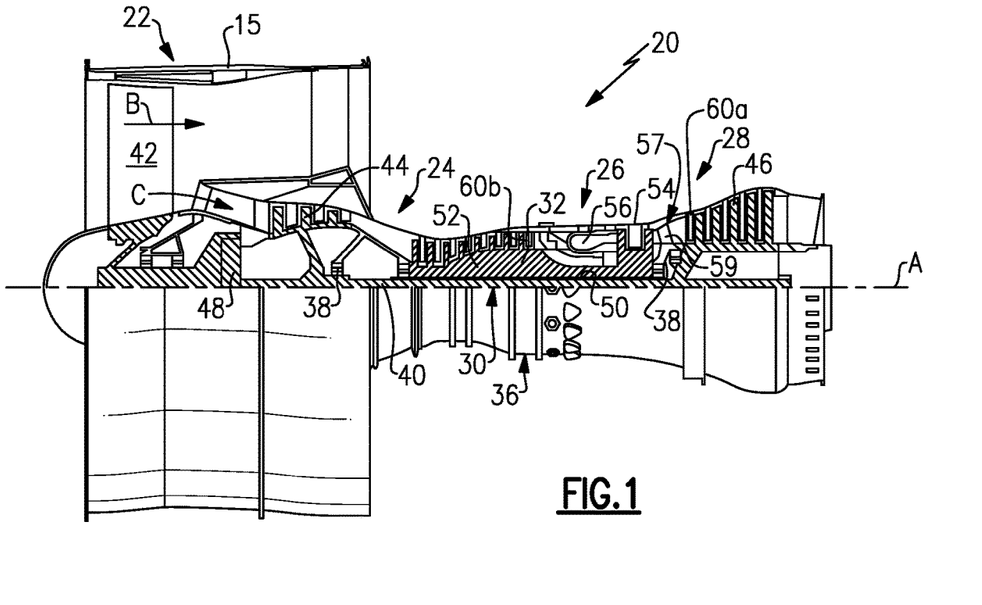
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine designs can include an augmentor section (not shown) among other systems or features.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 may be connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36, if included, is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans and gas turbines with multiple bypass streams.

A significant amount of thrust is provided by the bypass flow B due to the high bypass ratio. The fan section 22 of the engine 20 may be designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° R)/(518.7° R)]^{0.5}$. The "Low corrected fan tip speed" as disclosed herein according to one non-limiting embodiment is less than about 1150 ft/second.

In gas turbine engines air is often bled from the compressor for cooling components in the turbine that cannot withstand stoichiometric ideal temperatures of fuel burn; however, compressor bleed penalizes engine efficiency. Efficiency is governed by thermodynamics and mass flow through the turbine. Efficiency can generally be increased by lowering volume of compressor bleed, increasing velocity of compressor bleed, or increasing temperature of compressor bleed. These goals are challenging to meet because compressor bleed relies on the pressure differential between the compressor and the turbine. That is, the goals of lower volume, increased velocity, and increased temperature of compressor bleed are generally opposite to the goals of high pressure and low temperature compressor bleed desired for achieving good pressure differential. In this regard, to facilitate overcoming such challenges, an approach taken in this disclosure is to reduce the need for compressor bleed and cooling by enhancing the temperature resistance capability of the turbine or other components exposed to high temperatures. In particular, thermal resistance can be enhanced at the compressor exit and turbine inlet.

Figure 2A:
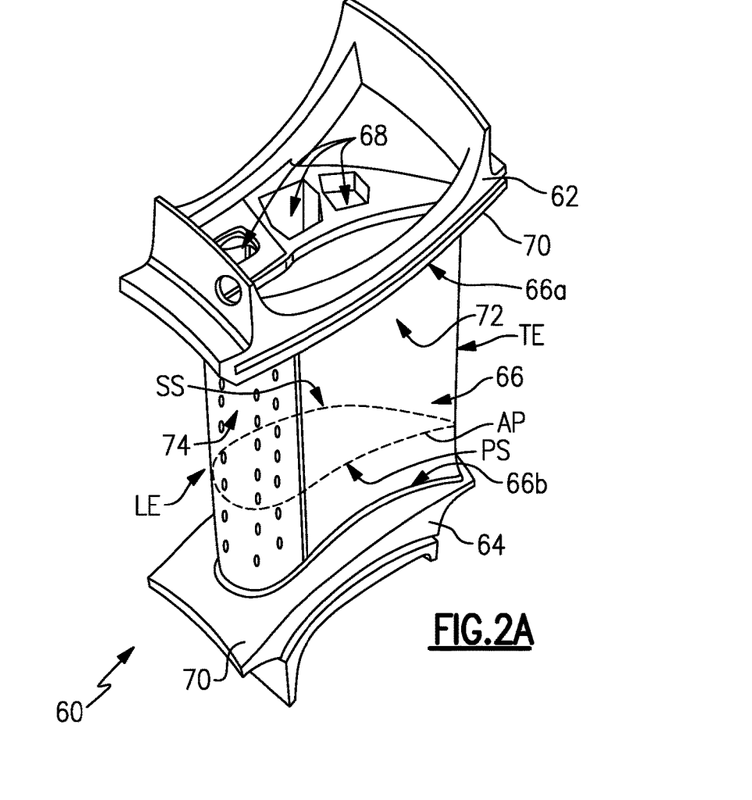
FIG. 2A illustrates an example airfoil of the engine of FIG. 1.
Figure 2B:
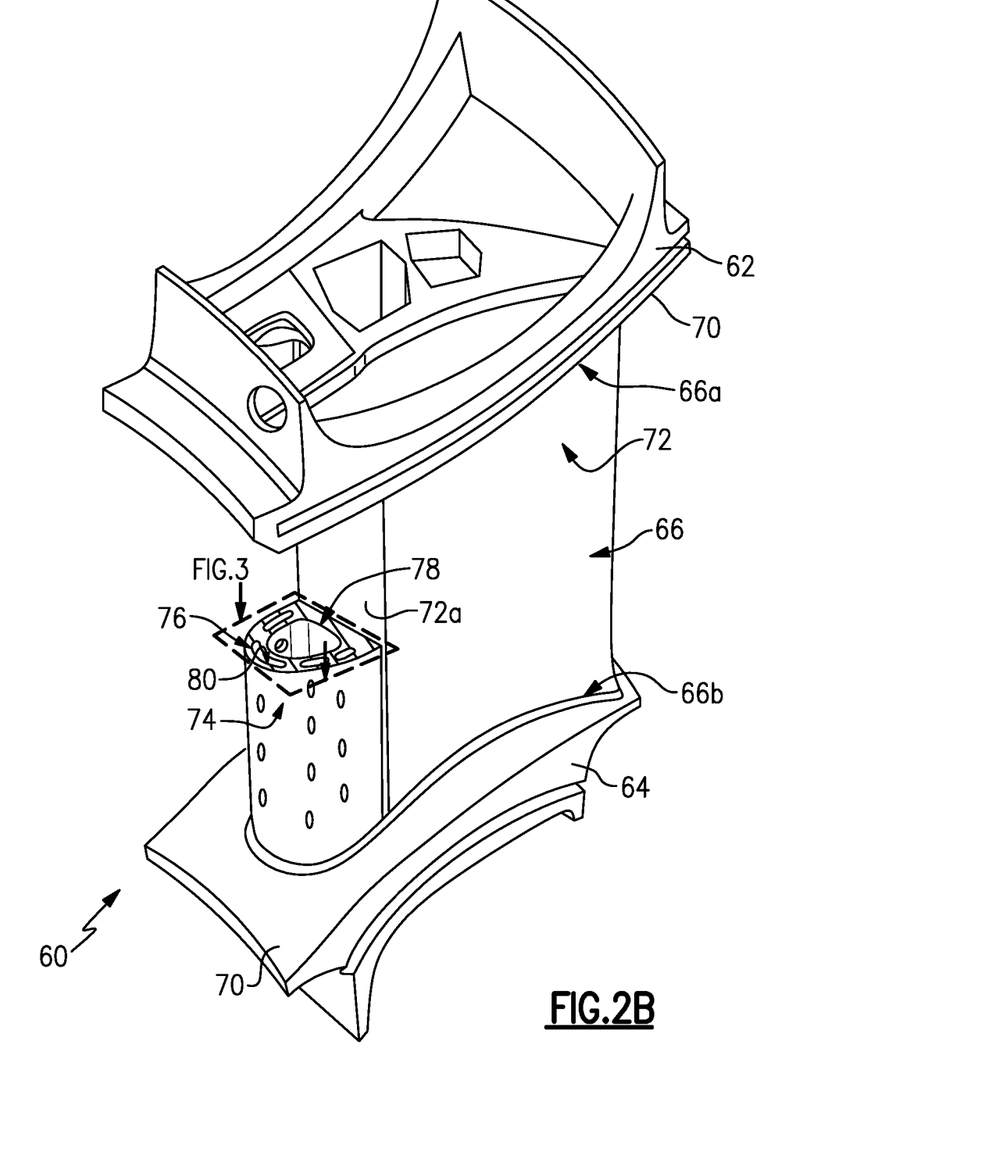
FIG. 2B illustrates the airfoil of FIG. 2A with a portion cut away.

FIG. 2A illustrates one such article, namely an airfoil 60. FIG. 2B illustrates the airfoil 60, with a portion cut away. For instance, the airfoil 60 can be a turbine vane, as represented at 60a in FIG. 1, or a compressor vane, as represented at 60b in FIG. 1. In this example, the airfoil 60 is a static vane. As will be appreciated, although the examples herein are described in the context of a vane, this disclosure is not limited to vanes, and the examples may also be applicable to blades or other airfoils that are exposed to high temperatures.

The airfoil 60 includes a first or outer end section 62, a second or inner end section 64, and an airfoil section 66 that spans in a longitudinal direction between a first radial end 66a at the first end section 62 and a second radial end 66b at the second end section 64. The longitudinal direction is also the radial direction in the engine 20 with regard to the engine central axis A. The airfoil section 66 defines an airfoil profile (AP), which is the peripheral shape of the airfoil section 66 when viewed in a radial direction. For example, the airfoil profile (AP) has a wing-like shape that provides a reaction force via Bernoulli's principle with regard to flow over the airfoil section 66. The full or complete airfoil profile (AP) generally includes a leading end (LE), a trailing end (TE), a pressure side (PS), and a suction side (SS). For example, the leading end (LE) is the region of the airfoil profile (AP) that includes a leading edge of the airfoil profile (AP), and the trailing end (TE) is the region of the airfoil profile that includes a trailing edge. The leading edge may be the portion of the airfoil profile (AP) that first contacts air or the foremost edge of the airfoil profile (AP). The trailing edge may be the portion of the airfoil profile (AP) that last contacts air or the aftmost edge of the airfoil profile (AP). For a variable vane, the leading edge may shift, depending on the orientation of the vane.

The airfoil section 66 may be hollow and include one or more internal cavities 68. The internal cavity or cavities 68 may be provided with cooling bleed air from the compressor section 24 of the engine 20, to cool the airfoil 60. In this example of a static vane, and the end sections 62/64 include respective platforms 70. Together, the platforms 70 provide the inner and outer bounds of the core gas path. Alternatively, for a variable vane, the end sections may have aerodynamic geometries without platforms; or for a blade, the airfoil 60 may include only an inner end section.

The airfoil section 66 is formed of an airfoil structure 72 and a ceramic airfoil piece 74 that is adjacent the airfoil structure 72. In this example, the airfoil structure 72 defines the suction side (SS), the pressure side (PS), and the trailing end (TE) of the airfoil profile (AP), and the ceramic airfoil piece 74 defines the leading end (LE), or at least a portion thereof. As will be appreciated, although the ceramic airfoil piece 74 in the illustrated example defines the leading end (LE), the ceramic airfoil piece 74 may additionally or alternatively define the pressure side (PS), the suction side (SS), and/or the trailing end (TE), or additional ceramic airfoil pieces may be used to form the pressure side (PS), the suction side (SS), and/or the trailing end (TE).

Figure 3:
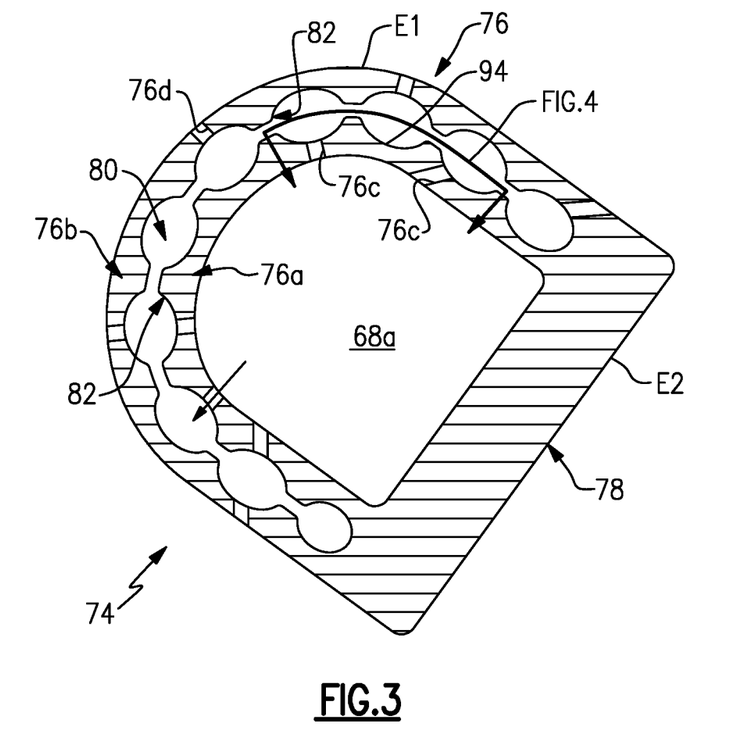
FIG. 3 illustrates a sectioned view of a ceramic airfoil piece of the airfoil of FIG. 2A.

Referring also to a sectioned view of the ceramic airfoil piece 74 in FIG. 3, the ceramic airfoil piece 74 includes an exterior wall 76 and an interior wall 78. For example, the exterior surface (E1) of exterior wall 76 is directly exposed in the core gas path, and the outside surface (E2) of the interior wall 78 is not exposed in the core gas path. The outside surface (E2) of the interior wall 78, which is an axial face, is located adjacent a forward axial face 72a of the airfoil structure 72. The exterior wall 76 and the interior wall 78 generally circumscribe a core passage 68a through the ceramic airfoil piece 74, which is one of the passages 68 of the airfoil section 66. The core passage 68a is generally a radially elongated passage with at least one open end that receives cooling bleed air through either the inner or outer end sections 62/64.

The exterior wall 76 includes inner and outer wall portions 76a/76b. In this example, the inner and outer wall portions 76a/76b are both connected with the interior wall 78. The exterior wall 76 includes an internal cooling circuit 80 defined between the inner and outer wall portions 76a/76b. For instance, the internal cooling circuit 80 is a passage or series of interconnected passages within the exterior wall 76.

The interior wall portion 76a includes a plurality of inlet holes 76c. Each inlet hole 76c opens at one end thereof to the core cavity 68a and opens at an opposed end thereof to the internal cooling circuit 80. Bleed air from the core cavity 68a is fed through the inlet holes 76c and may impinge on the outer wall portion 76b, to cool the outer wall portion 76b. The outer wall portion 76b includes a plurality of outlet holes 76d that open on one end thereof to the internal cooling circuit 80 and open on another end thereof to the exterior surface (E1) of the outer wall portion 76b. The bleed air in the internal cooling circuit 80 is discharged through the outlet holes 76d, to provide film cooling over the exterior surface of the outer wall portion 76b. As an example, the bleed air is fed into the internal cooling circuit 80 exclusively through the inlet holes 76c. That is, the internal cooling circuit 80 is otherwise sealed.

Figure 4:
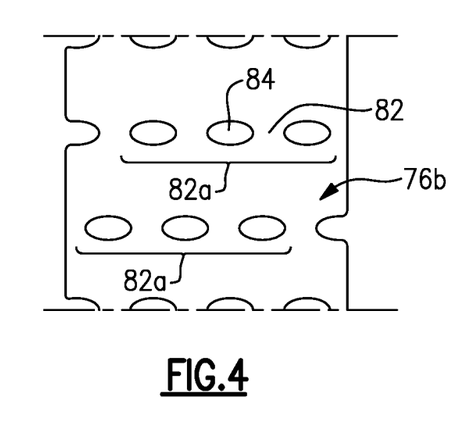
FIG. 4 illustrates a representative section of the airfoil of FIG. 3.

In this example, the inner and outer wall portions 76a/76b include a plurality of flow guides 82 that project into the passage of the internal cooling circuit 80. For instance, the flow guides 82 are protrusions that project from either the inner or outer wall portions 76a/76b toward the other of the inner or outer wall portions 76a/76b. As also shown in the view of FIG. 4, the flow guides 82 are separated by valleys 84. In this example, the flow guides 82 are disposed in a pattern of rows 82a. For example, the rows 82a may be substantially parallel. The flow guides 82 serve to facilitate distribution and mixing of the bleed air in the internal cooling circuit 80 to enhance cooling effectiveness.

Figure 5B:
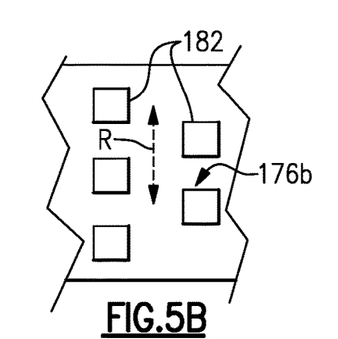
FIG. 5B illustrates a representative view of the ceramic airfoil section of FIG. 5A.

FIG. 5A illustrates a modified example of a ceramic airfoil piece 174. In this disclosure like reference numerals designate like elements where appropriate and reference numerals with the additional of one-hundred or multiples thereof designate modified elements that are understood to incorporate the same features or benefits of the corresponding elements. In this example, only the outer wall portion 176b includes flow guides 182 that project into the passage of the internal cooling circuit 180. The inner wall portion 176a includes no flow guides. As shown in FIG. 5B, the flow guides 182 are discrete protrusions that are staggered along the radial direction (R).

Figure 6A:
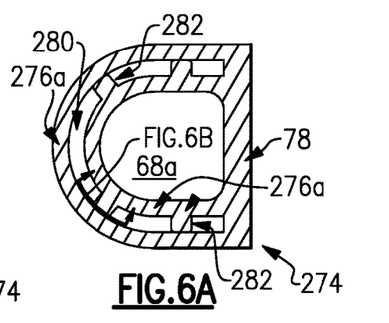
FIG. 6A illustrates a sectioned view of another example ceramic airfoil piece.
Figure 6B:
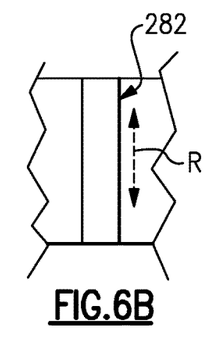
FIG. 6B illustrates a representative view of the ceramic airfoil section of FIG. 6A.

FIG. 6A illustrates another modified example of a ceramic airfoil piece 274. In this example, only the inner wall portion 276a includes flow guides 282 that project into the passage of the internal cooling circuit 280. The outer wall portion 276b includes no flow guides. As shown in FIG. 6B, the flow guides 282 in this example are radially elongated ridges. As will be appreciated, a further modification may include a combination of discrete protrusions and ridges in a pattern.

Figure 7:
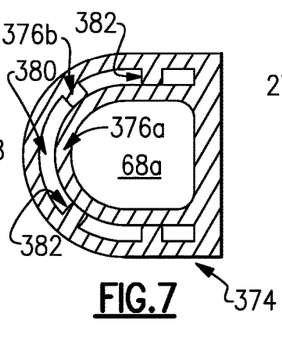
FIG. 7 illustrates a sectioned view of another example ceramic airfoil piece.

FIG. 7 illustrates another modified example of a ceramic airfoil piece 374, which is similar to ceramic airfoil piece 274. In this example though, only the outer wall portion 376b includes flow guides 382 that project into the passage of the internal cooling circuit 380. The inner wall portion 376a includes no flow guides. Similar to the flow guides 282, the flow guides 382 are radially elongated ridges.

Figure 8:
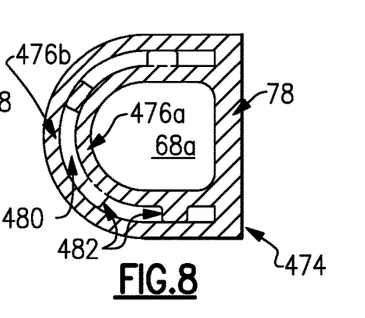
FIG. 8 illustrates a sectioned view of another example ceramic airfoil piece.

FIG. 8 illustrates another modified example of a ceramic airfoil piece 474. In this example, only the inner wall portion 476a includes flow guides 482 that project into the passage of the internal cooling circuit 480. The outer wall portion 476b includes no flow guides. Similar to the flow guides 182, the flow guides 482 are radially staggered discrete protrusions.

In each of the prior examples, the flow guides 82/182/282/382/482 extend from one of the wall portions but are disconnected or disjointed from the opposite wall portion. For instance, the tip ends of the protrusions are not attached to the opposite wall portion. This disconnection facilitates management of thermal stress in the ceramic airfoil piece. For instance, due to thermal gradients, the inner and outer wall portions may thermally expand/contract differently. By disconnecting the flow guides, the differential thermal expansion/contraction may facilitate reduction of thermal stresses between the inner and outer wall portions because the inner and outer wall portions do not restrict each other. In the examples that follow, the flow guides are connected to both the inner and outer wall portions, and thus tie the inner and outer wall portions together.

Figure 9:
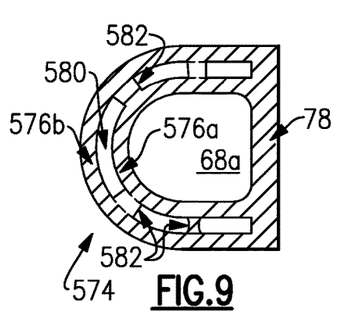
FIG. 9 illustrates a sectioned view of another example ceramic airfoil piece.

FIG. 9 illustrates another modified example of a ceramic airfoil piece 574. In this example, the flow guides 582 are connected to both the inner and outer wall portions 576a/576b and span across the passage of the internal cooling circuit 580. Similar to the flow guides 182, the flow guides 582 are discrete elements that are radially staggered.

Figure 10:
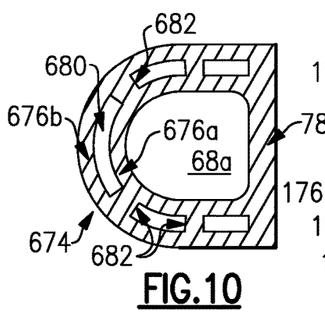
FIG. 10 illustrates a sectioned view of another example ceramic airfoil piece.

FIG. 10 illustrates another modified example of a ceramic airfoil piece 674. In this example, the flow guides 682 are connected to both the inner and outer wall portions 676a/676b and span across the passage of the internal cooling circuit 680. Similar to the flow guides 282, the flow guides 682 are radially elongated.

Figure 11:
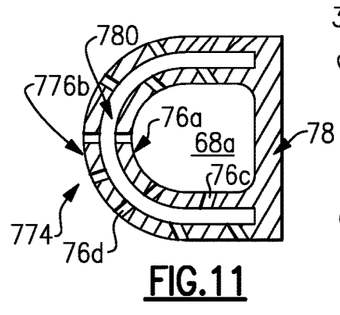
FIG. 11 illustrates a sectioned view of another example ceramic airfoil piece.

FIG. 11 illustrates another modified example of a ceramic airfoil piece 774. In this example, there are no flow guides in the internal cooling circuit 780.

Figure 12:
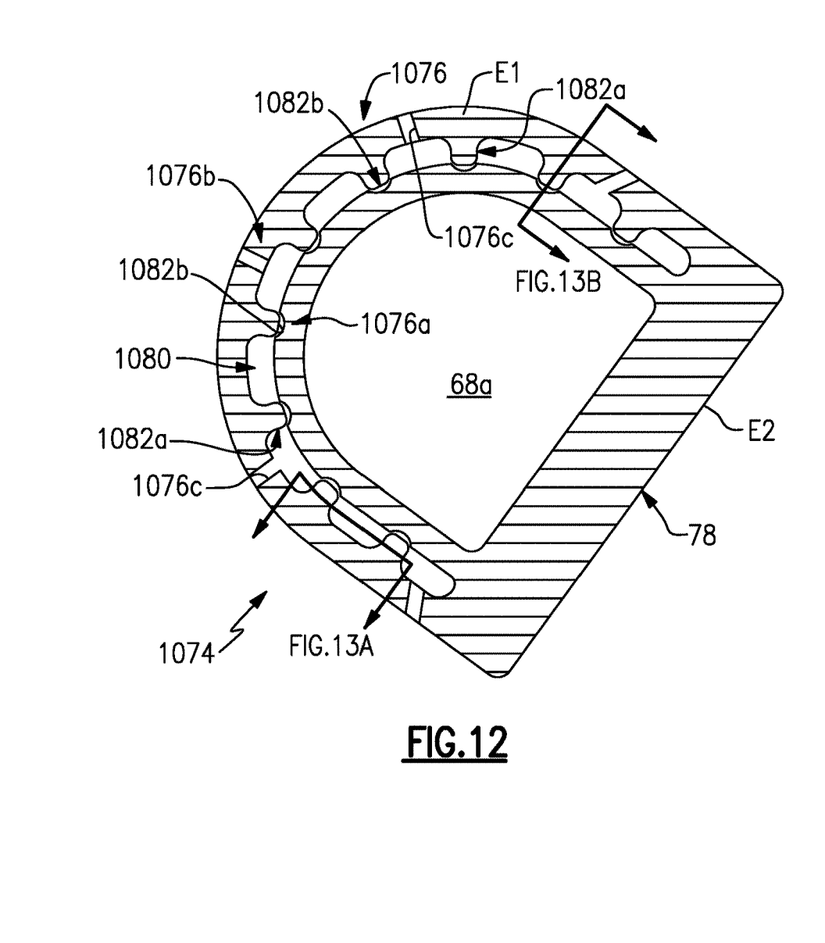
FIG. 12 illustrates a sectioned view of another ceramic airfoil piece.

FIG. 12 illustrates another example ceramic airfoil piece 1074. In this example, the inner wall portion 1076a is solid and continuous, and thus isolates the core cavity 68a from the internal cooling circuit 1080. Bleed air may be fed into the internal cooling circuit 1080 from either the inner or outer radial end of the ceramic airfoil piece 1074. The core cavity 68a may receive no bleed air or may receive a separate stream of bleed air from either the inner or outer radial end of the ceramic airfoil piece 1074.

The outer wall portion 1076b includes a plurality of outlet holes 1076c that open on one end thereof to the internal cooling circuit 1080 and open on another end thereof to the exterior surface (E1) of the outer wall portion 1076b. The bleed air in the internal cooling circuit 1080 is discharged through the outlet holes 1076c, to provide film cooling over the exterior surface (E1) of the outer wall portion 1076b. As an example, the bleed air is fed into the internal cooling circuit 1080 exclusively from either the inner or outer radial end of the ceramic airfoil piece 1074.

In this example, the outer wall portion 1076b includes a plurality of flow guides 1082a that project into the passage of the internal cooling circuit 1080. For instance, as also shown in the views in FIGS. 13A and 13B, the flow guides 1082a are discrete protrusions that project from the outer wall portion 1076b toward the inner wall portion 1076a. As an example, the flow guides 1082a may be arranged in patterned rows such that bleed air flows around the flow guides 1082a.

Figure 13A:
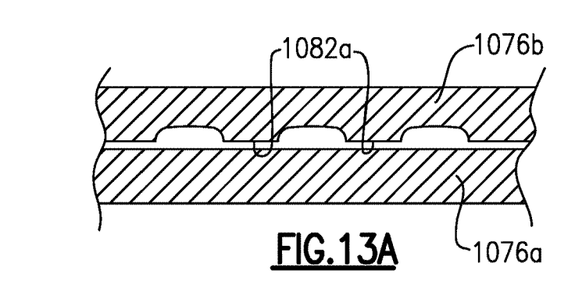
FIG. 13A illustrates a first representative view of an internal cooling circuit of the ceramic airfoil piece of FIG. 12.
Figure 13B:
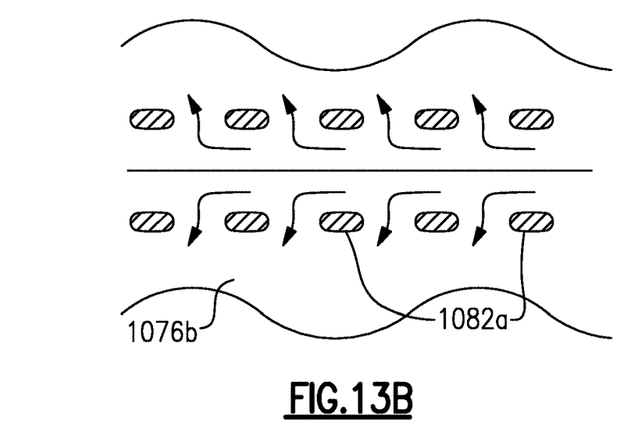
FIG. 13B illustrates a second representative view of the internal cooling circuit of the ceramic airfoil piece of FIG. 12.

The inner wall portion 1076a includes a plurality of flow dimples 1082b, which are valleys or recesses in the inner wall portion 1076a. In this example, the flow guides 1082a project into the flow dimples 1082b, and thus form a circuitous passage there between. The engagement of flow guides 1082a with the flow dimples 1082b also serves to lock the inner and outer wall portions 1076a/1076b together, yet allow for thermal expansion/contraction differences. For instance, the inner and outer wall portions 1076a/1076b may thermally expand/contract differently. The flow guides 1082a are not rigidly attached with the flow dimples 1082b and thus permit relative thermal movement to facilitate reduction of thermal stresses between the inner and outer wall portions 1076a/1076b. However, since the flow guides 1082a are in close proximity to the flow dimples 1082b, the flow guides 1082a may contact the flow dimples 1082b if there is a relatively large thermal expansion or contraction difference, thus limiting thermal movement.

Figure 14:
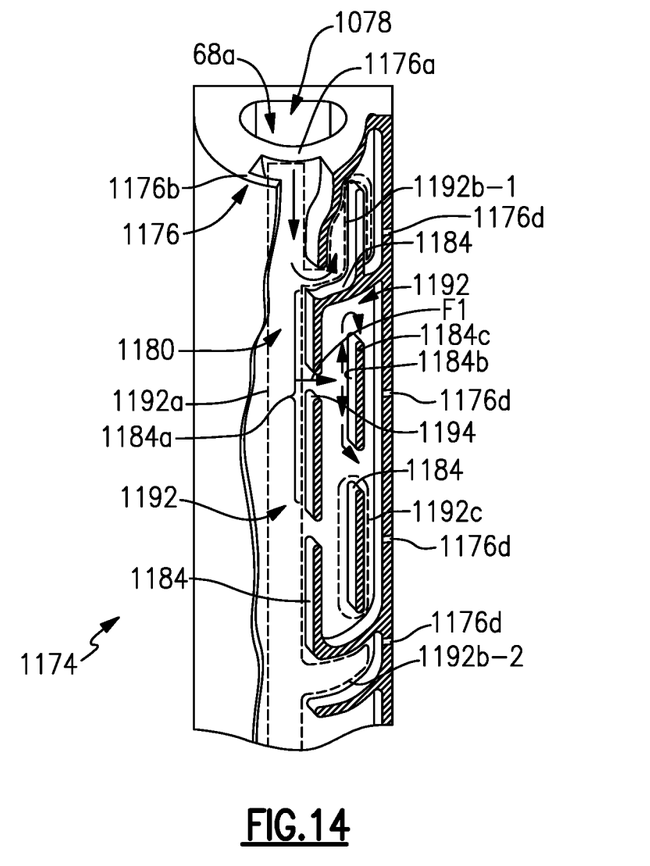
FIG. 14 illustrates another example of a ceramic airfoil piece.

FIG. 14 illustrates another example of a ceramic airfoil piece 1174 with a portion cut away. In this disclosure, like reference numerals designate like elements where appropriate and reference numerals with the addition of one-hundred or multiples thereof designate modified elements that are understood to incorporate the same features and benefits of the corresponding elements. In this example, the exterior wall 1176 includes inner and outer wall portions 1176a/1176b that define the internal cooling circuit 1180 there between. Internal ribs 1184 connect the inner wall portion 1176a to the outer wall portion 1176b and define circuitous circuit passages 1192 of the internal cooling circuit 1180.

For instance, the internal ribs 1184 may form one or more of several different types of passages 1192. For instance, the passages 1192 may include one or more manifold circuit passages 1192a that each feed two or more branch circuit passages. In the illustrated example, a serpentine branch circuit passage 1192b-1 extends off of the manifold circuit passage 1192a. A block or line branch circuit passage 1192b-2 also extends off of another portion of the manifold circuit passage 1192a. The passages 1192 may additionally or alternatively include one or more loop/impingement passages 1192c. Outlet holes 1176d are located at or near the ends of the branch circuit passages 1192b-1/1192b-2. The outlet holes 1176d serve as a pressure dump to urge the bleed air flow (F1) to flow to the respective branch circuit passages 1192b-1/1192b-2.

The internal cooling circuit 1180 may also include one or more of several different types of the internal ribs 1184. For instance, a first internal rib 1184a includes an impingement orifice 1194. The impingement orifice 1194 opens toward an impingement face 1184b of a second internal rib 1184c such that bleed air flow (F1) impinges upon the impingement face 1184b. The bleed air flow (F1) flows along the surface of the second internal rib 1184c and around the ends of the rib 1184c. The rib 1184c is in an impingement passage 1192c, with an outlet hole 1176*d* opposite the rib 1184*c*. The outlet hole 1176*d* serves as a pressure dump to urge the bleed air flow (F1) to flow around the rib 1184*c*.

The internal cooling circuit 1180 may be configured with the different types of passages 1192 and internal ribs 1184, depending on the cooling requirements at particular locations on the ceramic airfoil piece 1174. For instance, the bleed air in the serpentine branch circuit passage 1192*b*-1 or in a loop passage 1192*c* for impingement would pick up more heat than the bleed air in the block branch circuit passage 1192*b*-2, but the bleed air discharged from the serpentine branch circuit passage 1192*b*-1 or loop passage 1192*c* would be at a lower pressure (for film cooling) than the bleed air discharged from the block branch circuit passage 1192*b*-2.

Should the ceramic airfoil piece 74/174/274/374/474/574/674/774/1074/1174 require replacement, the airfoil 60 can be disassembled, the ceramic airfoil piece 74/174/274/374/474/574/674/774/1074/1174 can be replaced with a new one, and the airfoil 60 can be reassembled. Accordingly, the ceramic airfoil piece 74/174/274/374/474/574/674/774/1074/1174 can be produced individually as a new article for original airfoils 60 or as an individual replacement article for an existing airfoil.

The ceramic from which the ceramic airfoil piece 74/174/274/374/474/574/674/774/1074/1174 is formed may include, but is not limited to, oxides, carbides, nitrides, borides, silicides, and combinations thereof. A ceramic is a compound of metallic or metalloid elements bonded with nonmetallic elements or metalloid elements primarily in ionic or covalent bonds. In further examples, the ceramic is a monolithic ceramic or a ceramic matrix composite (CMC). For example, a monolithic ceramic is composed of a single, homogenous ceramic material. In comparison, a composite is composed of two or more materials that are individually easily distinguishable. A CMC has a reinforcement phase, such as ceramic or carbon fibers, dispersed in a ceramic matrix formed of oxides, carbides, nitrides, borides, silicides, or combinations thereof.

Figure 15:
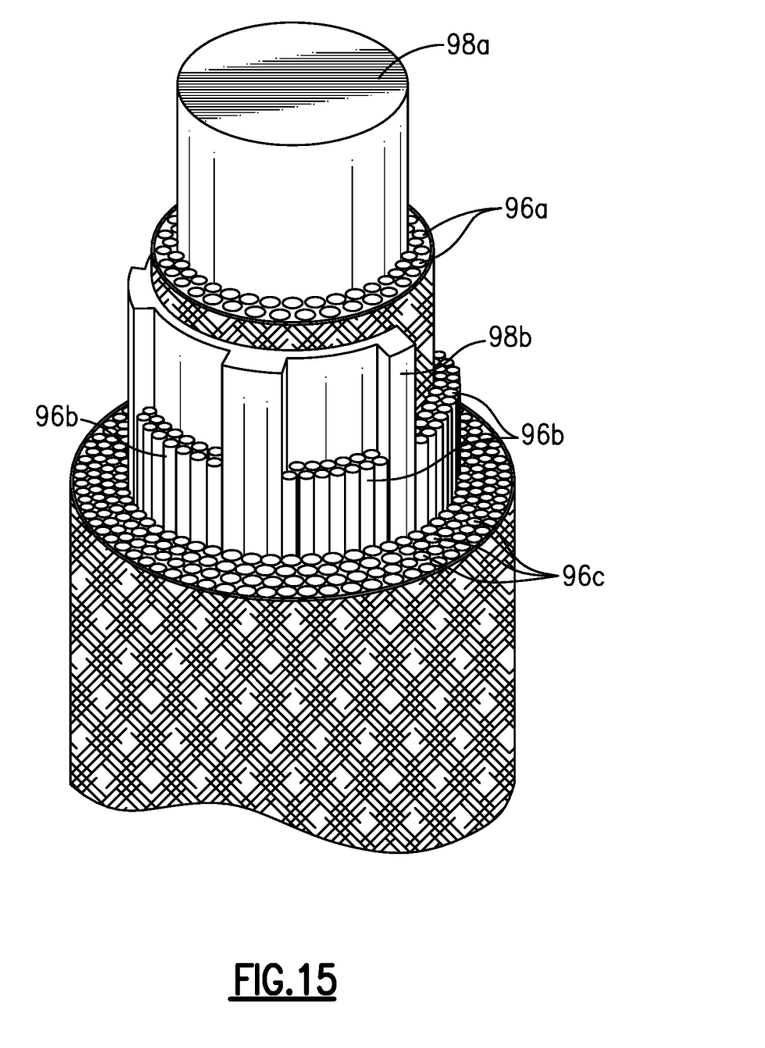
FIG. 15 depicts a method of fabricating a ceramic airfoil piece.

The ceramic airfoil piece 74/174/274/374/474/574/674/774/1074/1174, or other turbine engine articles such as but not limited to blade outer air seals, platforms or end walls, may be fabricated using a sacrificial core processing technique. The processing technique is depicted in FIG. 15. The method of fabrication may include wrapping preceramic layers 96*a* around a first sacrificial core element 98*a*. The preceramic layers 96*a* will form an inner wall portion as described herein and the first sacrificial core element 98*a* will form the core cavity 68*a* of the ceramic airfoil piece. A second sacrificial core element 98*b* is provided on the preceramic layers 96*a*. The second sacrificial core element 98*b* will form the internal cooling circuit and any negative features, such as the flow dimples. Preceramic layers 96*b* are built up around second sacrificial core element 98*b*. The preceramic layers 96*b* will form the flow guides or any positive features in the internal cooling circuit. Additional preceramic layers 96*c* are arranged around, and encompass, the entire structure. The preceramic layers 96*c* will form the outer wall portion and the interior wall of the ceramic airfoil piece. Once built, the structure may be treated to convert the preceramic layers 96*a*/96*b*/96*c* to ceramic and to remove the sacrificial core elements 98*a*/98*b*, leaving the core cavity 68*a* and internal cooling circuit.

For example, the treatment of the preceramic layers 96*a*/96*b*/96*c* may include one or more thermal treatments. The thermal treatments convert the preceramic layers 96*a*/96*b*/96*c* to ceramic and may also serve as a thermal treatment to remove the sacrificial core elements 98*a*/98*b*. Alternatively, the sacrificial core elements 98*a*/98*b* may be chemically removed. Although not limited, the layers 96*a*/96*b*/96*c* may be fiber layers that are impregnated with a preceramic polymer, and the sacrificial core elements 98*a*/98*b* may be carbon elements.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A method of fabricating a wall of a ceramic airfoil piece of a gas turbine engine, the method comprising:
   wrapping preceramic layers around a first, central sacrificial core element, followed by providing a second sacrificial core element on the preceramic layers, followed by building-up additional preceramic layers around the second sacrificial core element,
   converting the preceramic layers to ceramic,
   removing the first sacrificial core element to leave a central core cavity, and
   removing the second sacrificial core element to leave an internal cooling circuit in the wall of the airfoil piece,
   wherein the preceramic layers are fiber layers impregnated with preceramic polymer.

2. The method as recited in claim 1, wherein the airfoil piece defines a portion of an airfoil profile.

3. The method as recited in claim 2, wherein the airfoil piece defines a leading end of an airfoil profile.

4. The method as recited in claim 1, wherein the internal cooling circuit includes a circuitous passage within the wall.

5. The method as recited in claim 1, wherein the central core cavity is isolated from the internal cooling circuit.

6. The method as recited in claim 1, wherein the internal cooling circuit includes a passage loop.

7. The method as recited in claim 1, wherein removing of the first sacrificial core element and the second sacrificial core element includes thermal removal.

8. The method as recited in claim 1, wherein the wall includes a first internal rib and a second internal rib, the first internal rib including an impingement orifice that opens toward the second internal rib.

9. The method as recited in claim 1, wherein the wall includes inner and outer wall portions that define a passage there between, at least one of the inner or outer wall portions including a plurality of flow guides that project into the passage toward the other of the inner or outer wall portions.

10. The method as recited in claim 1, wherein the wall includes inner and outer wall portions that define a passage there between, at least one of the inner or outer wall portions including a plurality of flow dimples that border the passage.

11. The method as recited in claim 1, wherein the second sacrificial core element includes a curved base and elongated ridges projecting from the curved base.

12. The method as recited in claim 11, wherein the building-up of the additional preceramic layers includes providing the additional preceramic layers between adjacent ones of the elongated ridges.

13. The method as recited in claim 12, further comprising arranging outermost preceramic layers to surround the additional preceramic layers and the second sacrificial core element.

\* \* \* \* \*